(12) United States Patent
Diaz-Cuellar et al.

(10) Patent No.: US 9,118,686 B2
(45) Date of Patent: Aug. 25, 2015

(54) PER PROCESS NETWORKING CAPABILITIES

(75) Inventors: Gerardo Diaz-Cuellar, Kirkland, WA (US); Sermet Iskin, Bellevue, WA (US); Jorge P. Coronel Mendoza, Redmond, WA (US); Scott B. Graham, Seattle, WA (US); Nicholas D. Wood, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 13/226,223

(22) Filed: Sep. 6, 2011

(65) Prior Publication Data

US 2013/0061309 A1  Mar. 7, 2013

(51) Int. Cl.
*H04L 29/06* (2006.01)
*G06F 21/33* (2013.01)
*H04L 29/08* (2006.01)
*G06F 21/51* (2013.01)
*G06F 21/52* (2013.01)

(52) U.S. Cl.
CPC ............ *H04L 63/102* (2013.01); *G06F 21/335* (2013.01); *H04L 63/20* (2013.01); *G06F 21/51* (2013.01); *G06F 21/52* (2013.01); *G06F 2221/2121* (2013.01); *G06F 2221/2141* (2013.01); *H04L 67/34* (2013.01)

(58) Field of Classification Search
CPC ....... G06F 21/00; G06F 21/10; G06F 21/105; G06F 21/12; G06F 21/121; G06F 21/123; G06F 21/125; G06F 21/126; G06F 21/128; G06F 21/62; G06F 21/6209; G06F 21/6218; G06F 21/6227; G06F 21/6236; G06F 21/6245; G06F 21/6254; G06F 21/6263; G06F 21/6272; G06F 21/6281; G06F 21/629
See application file for complete search history.

(56) References Cited

U.S. PATENT DOCUMENTS

| | | |
|---|---|---|
| 5,974,549 A | 10/1999 | Golan |
| 6,101,607 A | 8/2000 | Bachand et al. |
| 6,117,187 A | 9/2000 | Staelin |
| 6,151,643 A | 11/2000 | Cheng et al. |
| 6,279,111 B1 | 8/2001 | Jensenworth et al. |

(Continued)

FOREIGN PATENT DOCUMENTS

| | | |
|---|---|---|
| CN | 1617101 | 5/2005 |
| CN | 1633084 | 6/2005 |

(Continued)

OTHER PUBLICATIONS

"Network Policy Settings Properties", Retrieved at <<http://technet.microsoft.com/en-us/library/cc772474%28WS.10%29.aspx>>, Retrieved Date: Jul. 25, 2011, pp. 1.

(Continued)

*Primary Examiner* — Darren D Schwartz
(74) *Attorney, Agent, or Firm* — Timothy Churna; Kate Drakos; Micky Minhas

(57) ABSTRACT

Per process networking capability techniques are described. In one or more implementations, a determination is made as to whether access to a network capability is permitted for a process that is executed on the computing device based on a token that is associated with the process. The token has one or more security identifiers that reference one or more network capabilities described in a manifest. The access to the network capability is managed based on the determination.

24 Claims, 8 Drawing Sheets

(56) References Cited

U.S. PATENT DOCUMENTS

| | | | |
|---|---|---|---|
| 6,308,173 B1 | 10/2001 | Glasser et al. | |
| 6,378,071 B1 | 4/2002 | Sasaki et al. | |
| 6,604,209 B1 | 8/2003 | Grucci et al. | |
| 6,697,569 B1 | 2/2004 | Gomez et al. | |
| 6,725,452 B1 | 4/2004 | Te'eni et al. | |
| 6,865,659 B2 | 3/2005 | Montemayor | |
| 7,031,276 B2 | 4/2006 | Inoue | |
| 7,069,330 B1 | 6/2006 | McArdle et al. | |
| 7,151,832 B1 | 12/2006 | Fetkovich et al. | |
| 7,152,243 B2 | 12/2006 | Bourne et al. | |
| 7,337,442 B2 | 2/2008 | VoBa et al. | |
| 7,392,383 B2 | 6/2008 | Basibes et al. | |
| 7,398,532 B1 | 7/2008 | Barber et al. | |
| 7,401,235 B2 | 7/2008 | Mowers et al. | |
| 7,472,377 B2 | 12/2008 | Anand et al. | |
| 7,475,396 B2 | 1/2009 | Kapoor | |
| 7,478,094 B2 | 1/2009 | Ho et al. | |
| 7,542,988 B1 | 6/2009 | Cook et al. | |
| 7,607,131 B2 | 10/2009 | Oe et al. | |
| 7,650,501 B1 | 1/2010 | Brunette, Jr. et al. | |
| 7,650,627 B1 | 1/2010 | Stancheva et al. | |
| 7,664,924 B2 | 2/2010 | Safa | |
| 7,698,393 B2 | 4/2010 | Milstein et al. | |
| 7,716,734 B2 | 5/2010 | Birrell et al. | |
| 7,774,753 B1 | 8/2010 | Reilly et al. | |
| 7,779,265 B2 | 8/2010 | Dubhashi et al. | |
| 7,925,875 B2 | 4/2011 | McAvoy | |
| 7,934,087 B2 | 4/2011 | Carter | |
| 8,001,528 B2 | 8/2011 | Bernabeu-Auban et al. | |
| 8,073,442 B2 | 12/2011 | Frank et al. | |
| 8,185,889 B2 | 5/2012 | Kinder et al. | |
| 8,468,608 B1 | 6/2013 | Hernacki et al. | |
| 8,990,561 B2 | 3/2015 | Sheehan et al. | |
| 2001/0021926 A1* | 9/2001 | Schneck et al. | 705/54 |
| 2002/0019941 A1* | 2/2002 | Chan et al. | 713/185 |
| 2003/0084134 A1 | 5/2003 | Pace et al. | |
| 2004/0030926 A1 | 2/2004 | Clark | |
| 2004/0039924 A1 | 2/2004 | Baldwin et al. | |
| 2004/0148514 A1* | 7/2004 | Fee et al. | 713/200 |
| 2004/0199787 A1* | 10/2004 | Hans et al. | 713/200 |
| 2005/0071641 A1* | 3/2005 | Basibes et al. | 713/182 |
| 2005/0091535 A1 | 4/2005 | Kavalam et al. | |
| 2005/0091658 A1 | 4/2005 | Kavalam et al. | |
| 2005/0132350 A1 | 6/2005 | Markley et al. | |
| 2005/0154738 A1 | 7/2005 | Thomas et al. | |
| 2005/0246762 A1* | 11/2005 | Girouard et al. | 726/2 |
| 2005/0256859 A1 | 11/2005 | Keohane et al. | |
| 2005/0273841 A1* | 12/2005 | Freund | 726/1 |
| 2005/0289348 A1* | 12/2005 | Joy et al. | 713/172 |
| 2006/0048129 A1 | 3/2006 | Napier et al. | |
| 2006/0080546 A1* | 4/2006 | Brannon et al. | 713/185 |
| 2006/0155986 A1 | 7/2006 | Kleinhuis et al. | |
| 2006/0174252 A1 | 8/2006 | Besbris et al. | |
| 2006/0174334 A1* | 8/2006 | Perlin et al. | 726/9 |
| 2006/0193467 A1 | 8/2006 | Levin | |
| 2006/0259606 A1 | 11/2006 | Rogers et al. | |
| 2006/0259980 A1* | 11/2006 | Field et al. | 726/27 |
| 2007/0027872 A1* | 2/2007 | Johnson et al. | 707/9 |
| 2007/0083655 A1 | 4/2007 | Pedersen | |
| 2007/0157287 A1* | 7/2007 | Lim | 726/1 |
| 2007/0157302 A1* | 7/2007 | Ottamalika et al. | 726/11 |
| 2007/0192500 A1 | 8/2007 | Lum | |
| 2007/0208857 A1 | 9/2007 | Danner et al. | |
| 2007/0234412 A1 | 10/2007 | Smith et al. | |
| 2007/0239981 A1 | 10/2007 | Lessing | |
| 2007/0240194 A1* | 10/2007 | Hargrave et al. | 726/1 |
| 2008/0066148 A1* | 3/2008 | Lim | 726/1 |
| 2008/0092133 A1 | 4/2008 | Mantere | |
| 2008/0120707 A1 | 5/2008 | Ramia | |
| 2008/0162698 A1 | 7/2008 | Hopen et al. | |
| 2008/0201705 A1 | 8/2008 | Wookey | |
| 2008/0244723 A1 | 10/2008 | Brewster et al. | |
| 2008/0282354 A1 | 11/2008 | Wobber et al. | |
| 2008/0307491 A1 | 12/2008 | Duri et al. | |
| 2009/0022325 A1 | 1/2009 | Naedele | |
| 2009/0100421 A1 | 4/2009 | Flaming et al. | |
| 2009/0113528 A1* | 4/2009 | Ananda et al. | 726/5 |
| 2009/0144659 A1 | 6/2009 | Do | |
| 2009/0170431 A1 | 7/2009 | Pering et al. | |
| 2009/0193507 A1 | 7/2009 | Ibrahim | |
| 2009/0222659 A1 | 9/2009 | Miyabayashi et al. | |
| 2009/0222894 A1 | 9/2009 | Kenny et al. | |
| 2009/0249283 A1 | 10/2009 | Bourdon | |
| 2009/0249436 A1 | 10/2009 | Coles et al. | |
| 2009/0307360 A1* | 12/2009 | Ianchici et al. | 709/229 |
| 2009/0307684 A1 | 12/2009 | Best et al. | |
| 2009/0327900 A1 | 12/2009 | Noll et al. | |
| 2010/0037216 A1 | 2/2010 | Carcerano et al. | |
| 2010/0058320 A1 | 3/2010 | Milligan et al. | |
| 2010/0081375 A1 | 4/2010 | Rosenblatt | |
| 2010/0107215 A1* | 4/2010 | Bechtel et al. | 726/1 |
| 2010/0153671 A1 | 6/2010 | Safa | |
| 2010/0174599 A1 | 7/2010 | Rosenblatt | |
| 2010/0192211 A1* | 7/2010 | Bono et al. | 726/7 |
| 2010/0221999 A1 | 9/2010 | Braun et al. | |
| 2010/0229165 A1 | 9/2010 | Normington et al. | |
| 2010/0287513 A1 | 11/2010 | Singh et al. | |
| 2010/0287547 A1 | 11/2010 | Korkishko et al. | |
| 2010/0293383 A1 | 11/2010 | Coughlin et al. | |
| 2010/0318997 A1 | 12/2010 | Li et al. | |
| 2011/0066851 A1* | 3/2011 | Bello et al. | 713/166 |
| 2011/0070827 A1 | 3/2011 | Griffin et al. | |
| 2011/0098030 A1 | 4/2011 | Luoma | |
| 2011/0125799 A1 | 5/2011 | Kandasamy et al. | |
| 2011/0231836 A1 | 9/2011 | Wookey | |
| 2011/0252417 A1 | 10/2011 | Cui et al. | |
| 2012/0005674 A1 | 1/2012 | Larimore et al. | |
| 2012/0194534 A1 | 8/2012 | Benno et al. | |
| 2012/0240236 A1 | 9/2012 | Wyatt et al. | |
| 2012/0297288 A1 | 11/2012 | Mansouri | |
| 2012/0303818 A1 | 11/2012 | Thibeault et al. | |
| 2013/0019233 A1 | 1/2013 | Pardehpoosh et al. | |
| 2013/0054734 A1 | 2/2013 | Bond et al. | |
| 2013/0062401 A1 | 3/2013 | Sheehan et al. | |
| 2013/0065526 A1 | 3/2013 | Pottier et al. | |
| 2013/0067459 A1 | 3/2013 | Sannidhanam | |
| 2013/0263262 A1 | 10/2013 | Forristal | |
| 2013/0283377 A1 | 10/2013 | Das et al. | |
| 2014/0173071 A1 | 6/2014 | Hazen | |
| 2014/0344667 A1 | 11/2014 | Risney et al. | |

FOREIGN PATENT DOCUMENTS

| | | |
|---|---|---|
| CN | 1959631 | 5/2007 |
| CN | 101017447 | 8/2007 |
| CN | 101616719 | 12/2009 |
| CN | 101622624 | 1/2010 |
| CN | 102129364 | 7/2011 |
| CN | 102938939 | 2/2013 |
| EP | 2086206 | 8/2009 |
| WO | WO-0205184 | 1/2002 |
| WO | WO-03100581 | 12/2003 |
| WO | WO-2009047473 | 4/2009 |
| WO | WO-2013039528 | 3/2013 |

OTHER PUBLICATIONS

"Securing the Process Control Network", Retrieved at <<http://www.enterasys.com/company/literature/threat-mgmt-process-control-wp.pdf>>, Retrieved Date: Jul. 11, 2011, pp. 6.

"International Search Report", Mailed Date: Sep. 3, 2012, Application No. PCT/US2011/055538, Filed Date: Oct. 9, 2011, pp. 8.

"Access Control Lists in Linux", Retrieved at <<http://users.suse.com/~agruen/acl/chapter/fs_acl-en.pdf>>, (Jul. 18, 2003), 13 pages.

"Android Developers and Permissions", Retrieved from: <http://developer.android.com/guide/topics/security/security.html> on Jul. 18, 2011, 5 pages.

"ClickOnce Security and Deployment", Retrieved at <<http://msdn.microsoft.com/en-us/library/t71a733d%28d=printer%29.aspx>> on Mar. 15, 2013, 4 pages.

"Dependency Resolution Rules", retrieved from http://nuget.codeplex.com/wikipage?title=Dependency%20Resolution on Jul. 15, 2011, 3 pages.

(56) References Cited

OTHER PUBLICATIONS

"LoKast shares media between iPhones and Android phones", retrieved from <<http://venturebeat.com/2010/07/21/lokast-shares-media-between-iphones-and-android-phones/>>, (Jul. 21, 2010), 3 pages.

"PCT Search Report and Written Opinion", Application No. PCT/US2011/055741, (Sep. 12, 2012), 9 pages.

"Security for Runtime Resources: Access Control Lists", retrieved from <http://publib.boulder.ibm.com/infocenter/wmbhelp/v6r1m0/index.jsp?topic=/com.ibm.etools.mft.doc/ap01380_.htm> on Jul. 27, 2011, 3 pages.

"Structural Analysis", retrieved from http://www.headwaysoftware.com/products/structure101/structrual-analysis.php#deep-structural-analysis-section on Jul. 15, 2011, 10 pages.

"User Accounts & Admin Privelages", Retrieved at <http://www.techno-kitten.com/Changes_to_PowerBuilder/9_New_in_Power._.._B111_New_-_User_Accounts_and_Aipb111_new_-_user_accounts_and_a.html>, Retrieved Date: Jul. 29, 2011,, 2 pages.

Abadi, Martin et al., "Access Control in a World of Software Diversity", HTOS '05, available at <http://research.microsoft.com/pubs/54665/accesscontrolwithdiversity.pdf>, (Jun. 2005), 6 pages.

Burrows, Daniel "Modelling and Resolving Software Dependencies", retrieved from http://people.debian.org/~dburrows/model.pdf, (Jun. 15, 2005), pp. 1-16.

Engelsma, Jonathan R., et al., "EncounterEngine: Integrating Bluetooth User Proximity Data into Social Applications", *IEEE International Conference on Wireless & Mobile Computing, Networking & Communication*, (2008), pp. 502-507.

Esbensen, Morten et al., "Pour Images—An Interactive System for Sharing Images", (2010), 9 pages.

Galindo, Jose A., et al., "Debian Packages Repositories as Software Product Line Models. Towards Automated Analysis", retrieved from http://www.isi.us.es/~segura/files/papers/galindo10-acota.pdf; *Proceedings of the First International Workshop on Automated Configuration and Tailoring of Applications*, (2010), 6 pages.

Kortuem, Gerd et al., "Sensing and Visualizing Spatial Relations of Mobile Devicse", *UIST '05 Proceedings of the 18th Annual ACM Symposium on User Interface Software and Technology*,, (Oct. 2005),10 pages.

Lange, Thomas "FAI Guide (Fully Automatic Installation)", retrieved from http://debian.uni-duisburg-essen.de/misc/FAI/fai-guide_2.5.3.pdf, (Dec. 5, 2005), 70 pages.

Manzoor, Umar et al., "Silent Unattended Installation Package Manager—SUIPM", retrieved from http://ieeexplore.ieee.org/stamp/stamp.jsp?tp=&arnumber=5172599; *International Conference on Computational Intelligence for Modelling Control & Automation*, (Dec. 10-12, 2008), pp. 55-60.

Rekimoto, Jun et al., "Proximal Interactions: A Direct Manipulation Technique for Wireless Networking", (Aug. 2003), 8 pages.

Rodriguez, Jamie "Windows Phone Capabilities Security Model", Retrieved from: <http://blogs.msdn.com/b/jaimer/archive/2010/04/30/windows-phone-capabilities-security-model.aspx> on Jul. 18, 2011,(Apr. 30, 2010), 3 pages.

Xing, Bo et al., "Proximeter: Enabling Mobile Proximity-Based Content Sharing on Portable Devices", *IEEE International Conference on Pervasive Computing and Communications, PerCom 2009*, (Mar. 2009), 3 pages.

"Foreign Office Action", CN Application No. 201210326881.7, Sep. 3, 2014, 13 pages.

"Foreign Office Action", CN Application No. 201210335798.6, Sep. 23, 2014, 9 pages.

"Non-Final Office Action", U.S. Appl. No. 13/230,640, Oct. 21, 2014, 15 pages.

"Final Office Action", U.S. Appl. No. 13/229,446, Apr. 9, 2014, 19 pages.

"Final Office Action", U.S. Appl. No. 13/230,640, Mar. 25, 2015, 18 pages.

"Foreign Office Action", CN Application No. 201210335798.6, May 5, 2015, 15 pages.

"Foreign Office Action", CN Application No. 201210335798.6, Sep. 23, 2014, 13 pages.

"International Search Report and Written Opinion", Application No. PCT/US2012/053623, Dec. 10, 2012, 9 pages.

"Non-Final Office Action", U.S. Appl. No. 13/229,446, Oct. 22, 2013, 16 pages.

"Non-Final Office Action", U.S. Appl. No. 13/229,446, Oct. 23, 2014, 17 pages.

Abadi,"A Logical Account of NGSCB", Retrieved from <http://research.microsoft.com/apps/pubs/default.aspx?id=54445> Apr. 19, 2014, Sep. 2004, 13 pages.

"Authorization API", Overview, Cloud Make Developers Zone, retrieved Jul. 9, 2012 from http://developers.cloudmade.com/projects/show/auth, 3 pages.

"CFUUID Reference", Retrieved from <https://developer.apple.com/library/mac/documentation/CoreFoundation/Reference/CFUUIDRef/CFUUIDRef.pdf>, Jun. 11, 2012, 16 pages.

"Class StreamSource", Retrieved from <http://docs.oracle.com/javase/6/docs/api/javax/xml/transform/stream/StreamSource.html> on Mar. 12, 2013, 2011, 6 pages.

"Customizing the Content, Look and Feel of XML Data", Retrieved from <https://docs.tibco.com/pub/hawk/4.9.0_november_2010/html/tib_hawk_http_adapter_user_guide/wwhelp/wwhimpl/common/html/wwhelp.htm#context=tib_hawk_http_adapter_user_guide&file=httpAdap.3.05.htm> on Mar. 12, 2013, Nov. 9, 2010, 3 pages.

"Extended European Search Report", EP Application No. 11872101.8, Apr. 9, 2015, 6 pages.

"Extended European Search Report", EP Application No. 11872418.6, Apr. 29, 2015, 7 pages.

"Extended European Search Report", EP Application No. 12830755.0, Mar. 24, 2015, 6 pages.

"Final Office Action", U.S. Appl. No. 13/228,695, May 31, 2013, 14 pages.

"Final Office Action", U.S. Appl. No. 13/228,695, Sep. 22, 2014, 12 pages.

"Foreign Office Action", CN Application No. 201210326881.7, May 19, 2015, 13 pages.

"Foreign Office Action", CN Application No. 201210331181.7, Oct. 8, 2014, 11 pages.

"Foreign Office Action", CN Application No. 201210335798.6, May 5, 2015, 13 pages.

"Identifying App Installations", Retrieved from <http://android-developers.blogspotin/2011/03/identifying-app-installations.html>, Mar. 30, 2011, 4 pages.

"Loading HTML Content from a Stream", Retrieved from <http://msdn.microsoft.com/en-us/library/aa752047(v=vs.85).aspx> on Mar. 12, 2013, Apr. 10, 2010, 5 pages.

"Manifest.permission", Android Developers, Apr. 28, 2011, 16 pages.

"Non-Final Office Action", U.S. Appl. No. 13/228,695, Feb. 12, 2013, 9 pages.

"Non-Final Office Action", U.S. Appl. No. 13/228,695, Apr. 30, 2014, 9 pages.

"Non-Final Office Action", U.S. Appl. No. 13/714,389, Jan. 5, 2015, 9 pages.

"SecureUDID", Retrieved from <http://www.secureudid.org/> on Dec. 11, 2012, 3 pages.

Beede,"MyShield: Protecting Mobile Device Data via Security Circles", Technical Report CU-CS-1091-12, Retrieved from <https://www.cs.colorado.edu/department/publications/reports/docs/CU-CS-1091-12.pdf> on Jul. 9, 2012, Jan. 29, 2012, 14 pages.

Bergemann,"UDID Replacement APIs in iOS 6", Sep. 2012, 4 pages.

Cutler,"Amid Privacy Concerns, Apple Has Started Rejecting Apps That Access UDIDs", TechCrunch, Mar. 2012, 3 pages.

Egele,"PiOS: Detecting Privacy Leaks in iOS Applications", In 18th Annual Network and Distributed System Security Symposium, Retrieved from <https://www.seclab.tuwien.ac.at/papers/egele-ndss11.pdf>, Feb. 2011, 15 pages.

Eno,"How to find serial number of Android device?", Retrieved from <http://stackoverflow.com/questions/2322234/how-to-find-serial-number-of-android-device>, Feb. 23, 2012, 6 pages.

(56) References Cited

OTHER PUBLICATIONS

Smith, "iPhone Applications & Privacy Issues: An Analysis of Application Transmission of iPhone", Retrieved from <http://www.kompatscher.biz/phocadownload/iPhone-Applications-Privacy-Issues.pdf>, Oct. 1, 2010, 19 pages.

Steinberg, "A Web Middleware Architecture for Dynamic Customization of Web Content for Wireless Clients", Proceedings of the 11th International Conference on World Wide Web, Available at <http://www2002.org/CDROM/refereed/483/>, May 7, 2002, 21 pages.

* cited by examiner

PER PROCESS NETWORKING CAPABILITIES

BACKGROUND

The ways in which users may gain access to executable code (e.g., software) for execution by a computing device is ever increasing. For example, users traditionally ventured to a "bricks-and-mortar" store to locate and purchase applications that were then installed manually by the users. Consequently, the users could typically trust the software due to the reputation of the store itself as well as the reputation of the developers of the software.

However, with the advent of application marketplaces users may have access to thousands of different types of applications from hundreds and even thousands of different developers. Therefore, a user may install a multitude of applications on a computing device from a wide variety of sources, some of which may even result in one application compromising another application. Consequently, it may be difficult to determine by the user and even by the marketplace itself as to whether the applications are trustworthy and therefore should be permitted to access functionality of a user's computing device. This difficulty may be further exacerbated by malicious parties that may attack the applications to access functionality supported by the application, such as access to sensitive data, even for applications that originated from a trustworthy source.

SUMMARY

Per process networking capability techniques are described. In one or more implementations, a determination is made as to whether access to a network capability is permitted for a process that is executed on the computing device based on a token that is associated with the process. The token has one or more security identifiers that reference one or more network capabilities described in a manifest. The access to the network capability is managed based on the determination.

In one or more implementations, a network is probed to identify proxy servers, subnets, or remote accessible networks. Access of a process executed on the computing device to network capabilities of the network is managed based on the identification of the proxy servers or subnets and an examination of a token that is associated with the process. The token has one or more security identifiers that reference network capabilities, described in a manifest, that are permitted for use by the process. This may be performed in a secure fashion that is not configured to be affected by the process.

In one or more implementations, one or more computer-readable storage media comprise instructions stored thereon that, responsive to execution on a computing device, causes the computing device to execute an operating system to form a token having one or more security identifiers that reference network capabilities described in a manifest that corresponds to a process formed through execution of executable code by the computing device, the executable code and the manifest installed on the computing device from a package, the token usable by the operating system to manage access of the process to the network capabilities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditionally, applications that were executed on a computing device were given access to most if not all of the functionality of the computing device, even regardless of whether this access was desired. This may include unfettered access to a network. However, in some instances these same applications may be exploited by malicious parties. The unfettered access may therefore be used by these malicious parties to access resources on an internet, receive unsolicited connections, access web-connected functionality, and so on. Consequently, the broad access given to these applications may now present a significant risk to the user's computing device as well as to devices that are accessible to the computing device.

Per process network capability techniques are described. In one or more implementations, a capabilities model is utilized to ensure that applications have access to developer-defined network resources and cannot access other network resources that are not defined by the developer. The capabilities model may therefore prevent exploited applications from taking advantage of network resources that are not normally utilized by the application. In this way, the model may be used to ensure that compromised applications are limited to access the defined network capabilities and limit exploitation of network capabilities that were defined by the developer as inaccessible to the application. A variety of other examples are also contemplated, further discussion of which may be found in relation to the following sections.

In the following discussion, an example environment is first described that may employ the network capability techniques described herein. Example procedures are then described which may be performed in the example environment as well as other environments. Consequently, performance of the example procedures is not limited to the example environment and the example environment is not limited to performance of the example procedures.

Example Environment

Figure 1:
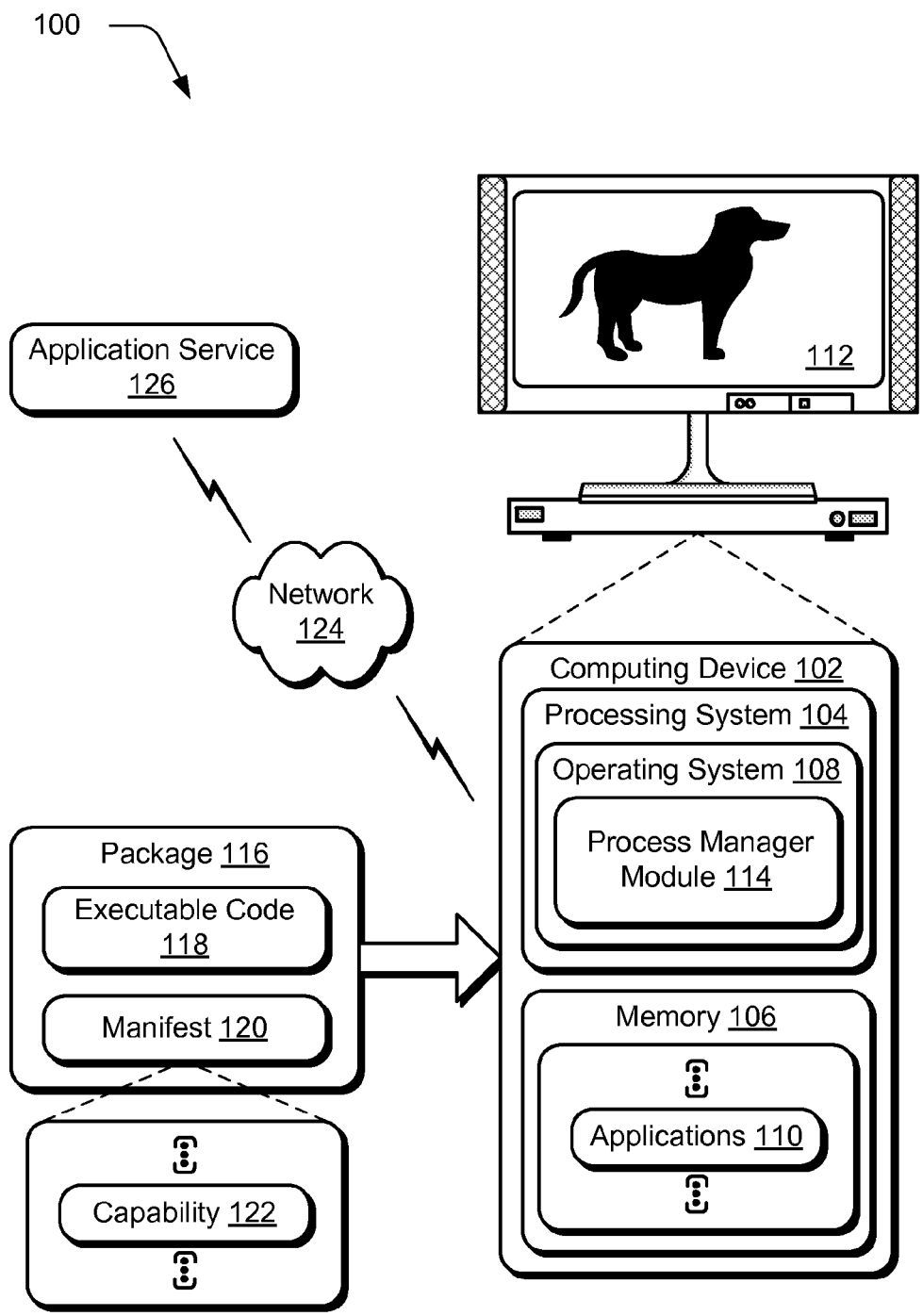
FIG. 1 is an illustration of an environment in an example implementation that is operable to perform per process networking capability techniques.

FIG. 1 illustrates an operating environment in accordance with one or more embodiments, generally at 100. Environment 100 includes a computing device 102 having a processing system 104 that may include one or more processors, an example of computer-readable storage media illustrated as memory 106, an operating system 108, and one or more applications 108. Computing device 102 can be embodied as any suitable computing device such as, by way of example and not limitation, a desktop computer, a portable computer, a handheld computer such as a personal digital assistant (PDA), mobile phone, tablet computer, and the like. Different examples of a computing device 102 is shown and described below in FIGS. 6 and 7.

The computing device 102 also includes an operating system 108 that is illustrated as being executed on the processing system 104 and is storable in memory 106. The computing device 102 further includes applications 110 that are illustrated as being stored in the memory 106 and are also executable on the processing system 104. The operating system 108 is representative of functionality of the computing device 102 that may abstract underlying hardware and software resources for use by the applications 110. For example, the operating system 108 may abstract functionality of how data is displayed on the display device 112 without the applications 110 having to "know" how this display is achieved. A variety of other examples are also contemplated, such as to abstract the processing system 104 and memory 106 resources of the computing device 102, network resources, and so on.

The computing device 102 is also illustrated as including a process manager module 114. The process manager module 114 is representative of functionality of the computing device 102 to manage access of executable code to capabilities of the computing device 102. For example, the computing device 102 may receive a package 116 having executable code 118 (e.g., an application) for installation on the computing device 102. The package 116 may also include a manifest 120 generated by a developer of the executable code 118 that describes one or more capabilities 122 of the computing device 102, which may include an ability of the computing device 102 to access a network 124. Thus, this description may describe which capabilities of the computing device 102 a process formed through execution of the executable code 118 is permitted and/or not permitted to access. For example, the manifest 120 may list a capability that is to be made accessible to the process and/or may list a capability that is to be made inaccessible to the process. In this way, a developer of the executable code 118 may specify capabilities in the manifest 120 to help reduce and even eliminate an ability of a malicious party to compromise the application to access capabilities that are not typically accessed by the executable code 118.

The process manager module 114, for instance, may leverage firewall functionality as part of the module itself or in communication with another module, e.g., a dedicated firewall module. This functionality may be used to permit or deny access to the network 124 as specified by the manifest of the package 116. Thus, the executable code 118 may function as contemplated by a developer of the code and thereby help reduce an opportunity to compromise the code by malicious parties.

The package 116 may be received for installation on the computing device 102 from a variety of different sources. For example, an application service 126 (e.g., an application store) may be access by the computing device 102 via the network 124, e.g., the Internet. Upon purchase, the package 116 that includes the executable code 118 and the manifest 120 may be communicated via the network 124 for installation on the computing device 102. In another example, a user may obtain computer-readable storage media (e.g., an optical disc) that contains the package 116. Further discussion of installation of the package 118 including the executable code 118 and the manifest on the computing device 102 may be found in relation to FIG. 2.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
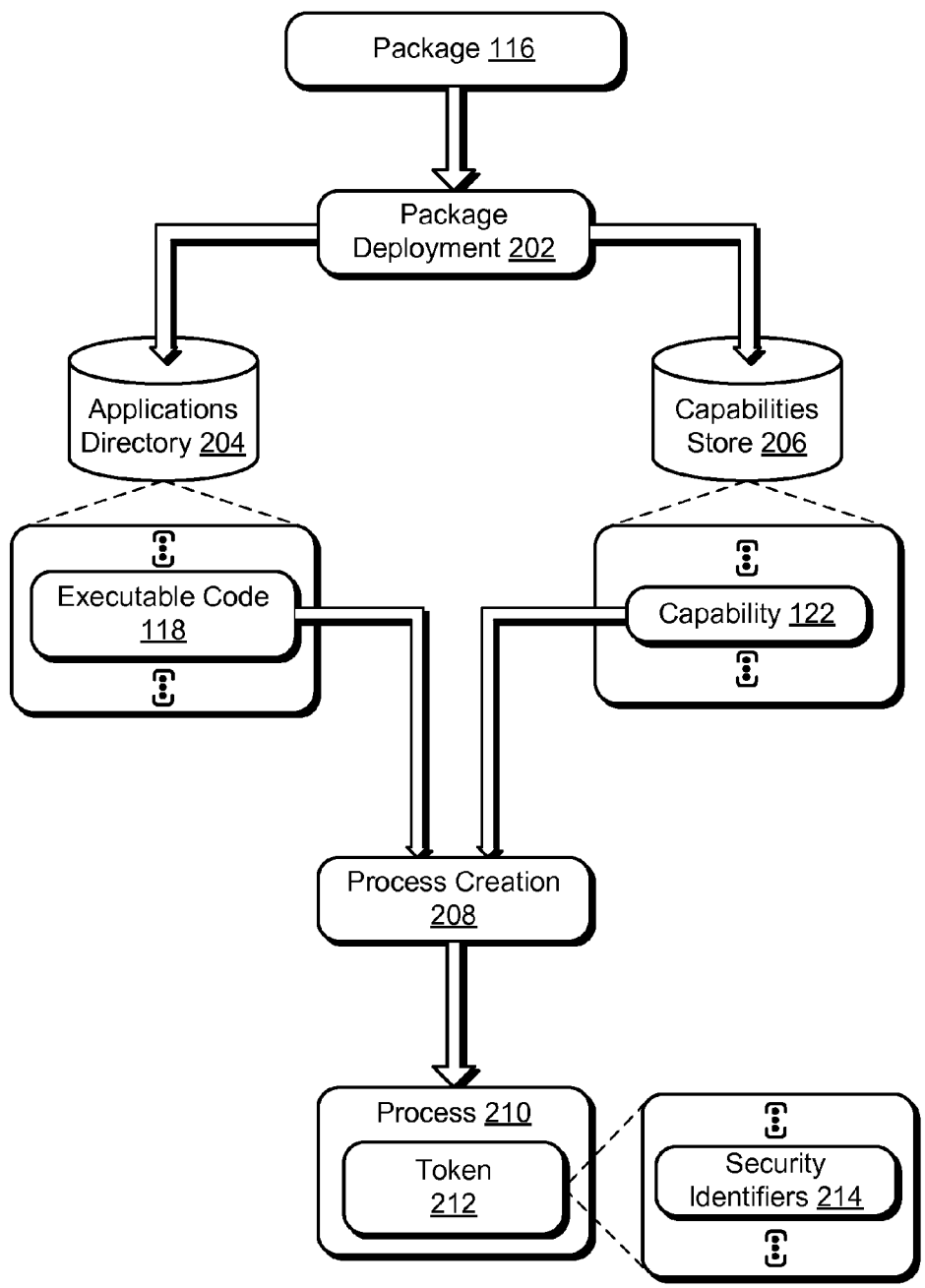
FIG. 2 is an illustration of a system in an example implementation showing example implementation of per process networking capability techniques.

FIG. 2 is an illustration of a system 200 in an example implementation showing installation of a package 116 on the computing device 102 and formation of a token to manage process access to network capabilities of the computing device. As previously described, when a developer creates executable code 118, a manifest 120 may also be created that contains a set of capabilities 122 that are declared for processes implemented through execution of the code. These capabilities 122 may be registered during installation, which is illustrated as package deployment 202 in FIG. 2.

For example, the executable code 118 may be installed for access via an applications directory 204. The capabilities 122 described in the manifest may be installed in a capabilities store 206 and associated with an identity of the package 116 and/or executable code 118 itself. In one or more implementations, the capabilities store 206 is configured to be tamper resistant (e.g., physically and/or electronically) such that malicious code cannot gain access to or modify the capabilities 122 described therein, such as to prevent access by the processes themselves.

During process creation 208 that results from execution of the executable code 118, an identifier is obtained that is usable by the process manager module 114 to locate capabilities described for the process 210, e.g., an identifier of the package 116, the executable code 118, and so on as described above. These capabilities 122 are then used as part of the process creation 208 to form a token 212 that may be used by the process manager module 114 to control access to the capabilities of the computing device 102.

The token 212, for instance, may include one or more security identifiers 214 that correspond to one or more of the capabilities 122 described in the capabilities store 206 for that process. In other words, the token 212 is populated with the relevant capabilities associated with the package 116, as security identifiers 214. Thus, the process manager module 114 may utilize the token 212 when access to a capability is requested by a process 210 to determine whether that access is to be permitted for that process 210.

In one or more implementations, the token 212 cannot be manipulated by the process 210. The token 212 may also allow the process 210 to participate in access verification checks for a capability (e.g., ACLs for a resource). Further, the process manager module 114 may also implement techniques that involve decisions based on the presence of a capability (or combination of capabilities) before granting access to a capability. Because the process 210 does not have direct access to the token, the process manager module 114 may function as a broker that leverages the immutability of the token 212 to ensure that appropriate access is granted to the process 210.

A variety of different capabilities 122 may be referenced by the security identifiers 214. Additionally, the security identifiers 214 may reference these capabilities in a variety of ways. For example, a developer may create executable code 118 (e.g., an application) and a manifest 120 that contains a set of declared capabilities for each of the processes in a package 116 that are implemented through execution of the executable code 118. This package 116 may also have a "strong identity," in which network capabilities are registered with an operating system 108 using this identity when the package 116 is installed.

Therefore, when the process 210 is subsequently launched (and includes the package identity as a process creation parameter), the token 212 may be populated with a process identity and network capabilities may be populated as security identifiers 214. Further, the operating system 108 may prevent the process 210 from modifying the token 212. In one or more implementations, child processes may inherit the identity and a subset of the network capabilities, in which the subset is defined by the parent.

A variety of different capabilities 122 may be specified by the manifest 120 for use in managing access of the process 210, e.g., from pre-defined network capabilities to rich firewall-type rules. For example, an "internet-client" capability may be defined to manage access to outgoing connections to the network 124 (e.g., internet) by the process 210. In another example, an "internet client/server" capability may be defined to permit both incoming and outgoing network 124 connections. This capability, for instance, may be used to permit the process to accept unsolicited connections from the Internet as well as send and receive data through a firewall. In a further example, a "PrivateNetworkClientServer" capability may be defined to permit communication to or from computing devices on a same defined network 124, e.g., a home network, work network, intranet, and so on. A variety of other examples are also contemplated, such that rich firewall rules may be created that reference capabilities that may become even more specific and richer, e.g., access to specific ports. In this way, use of the security identifiers 214 in the token 212 may permit the process manager module 114 to manage access of the process 210 to network capabilities, an example of which is described in relation to the following figure.

Figure 3:
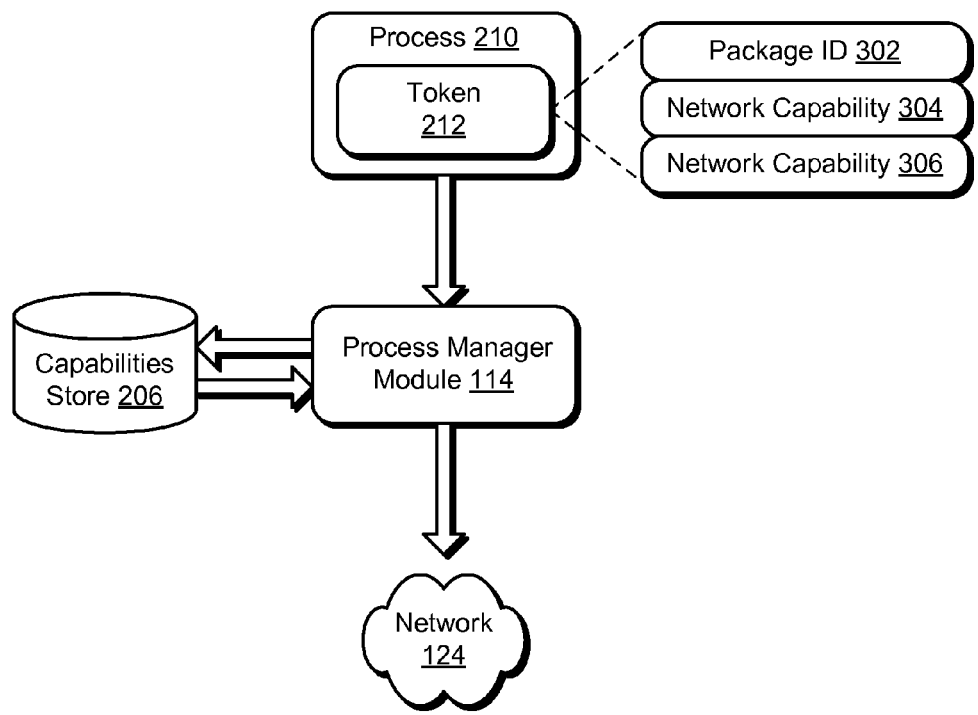
FIG. 3 is another illustration of a system in an example implementation showing example implementation of per process networking capability techniques.

FIG. 3 depicts a system in an example implementation showing management of access of a process to network capabilities by a process manager module of FIG. 1. When a process 210 requests access to the network 124, the process manager module 114 verifies an application identity (e.g., a package ID 302), and ensures that the network capabilities 304, 306 specified by the token 212 are a subset of the network capabilities registered at installation in the capabilities store 206. If the remaining capabilities are sufficient for the network communication, the communication is allowed. Otherwise, it is blocked. Thus, the process manager module 114 may function as part of a firewall to permit and/or deny access to the network capabilities of the computing device 102.

In one or more implementations, an application may be permitted to access a full set of capabilities that are registered in the capabilities store 206. However, it may also be possible for a process 210 to create a child process where that is not to have the full set of access rights that are available to the parent.

As previously described, a variety of different capabilities may be declared. Further, the capabilities may be combined to give the process 210 internet and intranet (e.g., private network) access, for either outbound (e.g., client) or inbound and outbound connections (e.g., client & server).

The internet capability may also allow access to HTTP proxies. For example, the process manager module 114 may actively probe the network to determine if there are proxy servers or subnets, so networking capabilities that are tied to a private network (e.g., intranet) or internet may be leveraged correctly. If an Active Directory server contains specific information on the subnet definitions, the process manager module 114 may also leverage this information to help determine the edge of the subnet. Mechanisms may also be employed in which subnets and proxies are pre-specified through administrative management tools and thus probing is not involved. Without such specification through probing and/or use of the administrative management tools, some devices could be assigned to the incorrect network type, and therefore the process manager module 114 could then incorrectly allow or deny access. Thus, the process manager module 114 may correctly manage capabilities based on this identification, e.g., whether available via an intranet or Internet.

In one or more implementations, ports that are deemed critical are blocked from unsolicited inbound access to prevent common attack vectors using the same mechanisms. These setting may also be manually configured via policy. Loopbacks (e.g., connections to same machine, using 127.0.0.1) may also be protected, thereby preventing a process 210 from "working around" the capabilities defined for that process. For example, loopback may be tied to a "PrivateNetworkClientServer" capability described above, but it should be readily apparent that in another example this may be specified as a separate capability using the model.

Thus, these techniques may be used to support a mechanism to restrict network access per-process and offer varying degrees of granularity as described. As described above, per-process networking capabilities may be tied to a strong identity for the process. This identity may also be inherited by child processes, which ensures that a process is not able to circumvent the networking capabilities that have been granted to the process by a parent process. High-fidelity networking capabilities, which have the same flexibility as firewall rules may also be supported by the process manager module 114. The networking capabilities, for instance, may be registered at installation with a firewall, and can have flexibility as can be found for a firewall rule, which may include network type, connection type, and inbound/outbound connections. Traffic direction may also be associated with network profiles as fined by a firewall.

Further, declared networking capabilities may be combined, to provide access that is a union of the different capabilities. For example, network capabilities can be combined for a process 210 to provide a combination of different network access, such as private network (e.g., intranet) access, and outbound internet access. A variety of other examples are also contemplated, further discussion of which may be found in relation to the following procedures.

Yet further, firewall rules used to enforce capabilities may be modified or enforced or tweaked dynamically at run time, e.g., by a "high integrity" system to provide capabilities that may have increased usefulness. Capabilities that are defined may be isolated and/or passed to other firewall components in the system to also further manage the application in the network correctly.

Example Procedures

The following discussion describes per process networking capability techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 of FIGS. 2 and 3, respectively.

Figure 4:
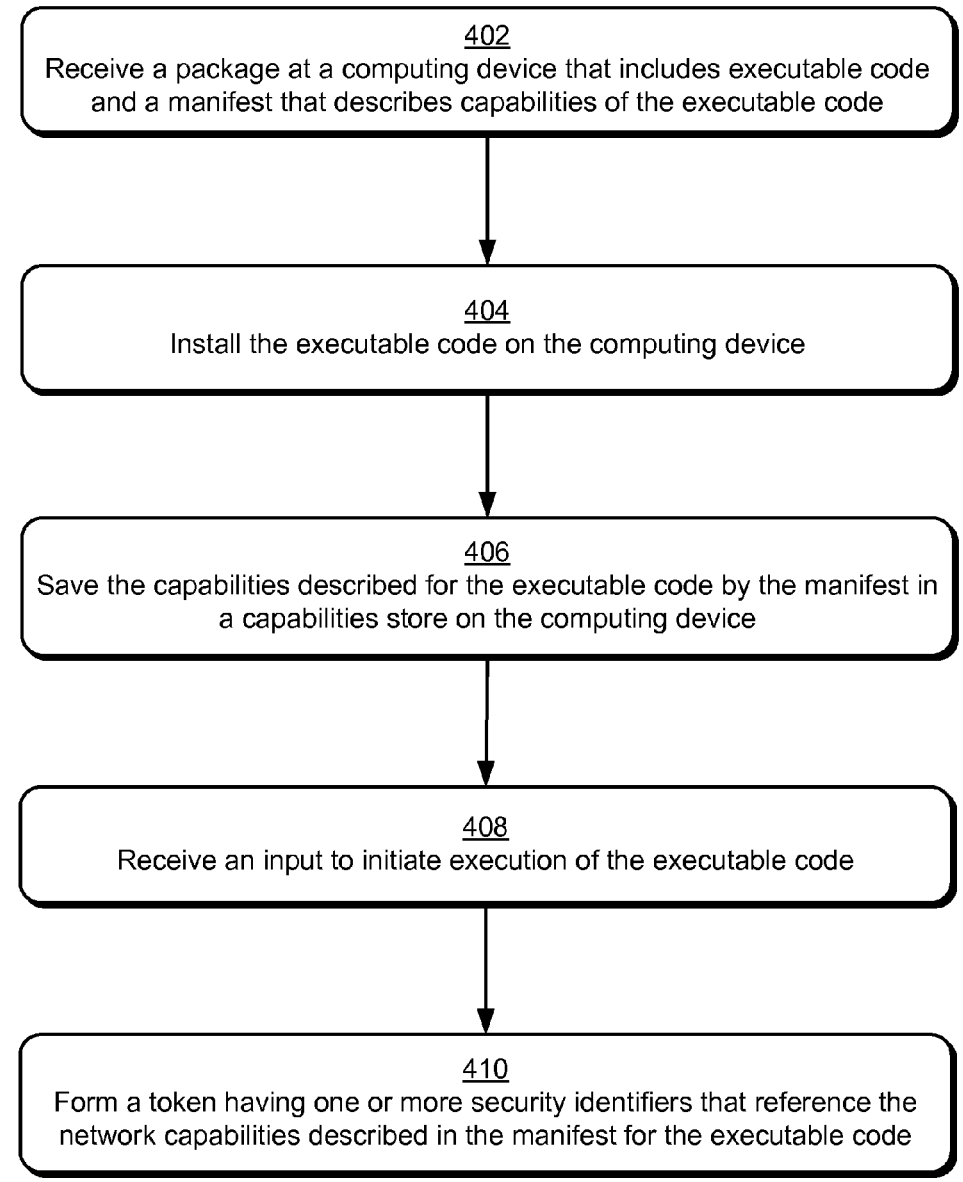
FIG. 4 is a flow diagram depicting a procedure in an example implementation in which a package having executable code and a manifest are installed on a computing device and used to form a token responsive to initiating execution of the executable code.

FIG. 4 depicts a procedure 400 in an example implementation in which a package having executable code and a manifest are installed on a computing device and used to form a token. A package is received at a computing device that includes executable code and a manifest that describes capabilities of the executable code (block 402). The package 116, for instance, may be stored on computer readable storage media, downloaded from an application service 126 over a network 124, and so on. As previously described, the manifest 120 may describe network capabilities of the computing device 102 that are to be used during execution of the code, as contemplated by a developer of the executable code 122.

The executable code is installed on the computing device for execution (block 404). The executable code 122, for instance, may be configured as an application to be installed on the computing device for access through an applications directory, a third-party plug-in module, and so forth.

The network capabilities described for the executable code by the manifest are saved in a capabilities store on the computing device, the saved capabilities usable to form a token to manage access of one or more processes, formed through execution of the executable code, to capabilities of the computing device (block 406). The capabilities store 206, for instance, may be configured to be tamper resistant, e.g., physically and/or electronically. In this way, capabilities described therein are not accessible by unauthorized entities, are not accessible by processes that are executed on the computing device 102, and so on. Thus, the description of the capabilities may be considered "trustworthy" and therefore used to form a token that may be used to manage access by the process.

An input may then be received to initiate execution of executable code installed on the computing device (block 408). The input, for instance, may be received through user selection of a representation of the code, e.g., an icon, tile, and so on. The input may also originate from the code itself (e.g., wake at predetermined intervals), from other code executed on the computing device 102, and so on.

A token is formed having one or more security identifiers that reference network capabilities described in a manifest for the executable code (block 410). As previously described, the security identifiers 122 may enumerate capabilities that are described in the capabilities store 206. The token 212, for instance, may include an identifier that matches an identifier of the executable code 118 and/or package 116, may be passed by the executable code 118 itself when requesting access to a capabilities (e.g., the token itself and/or an identifier usable to find the token 212), and so forth. The token 212 may then be used to manage access of the process 210 to one or more network capabilities of the computing device 102, an example of which may be found in relation to the following figure.

Figure 5:
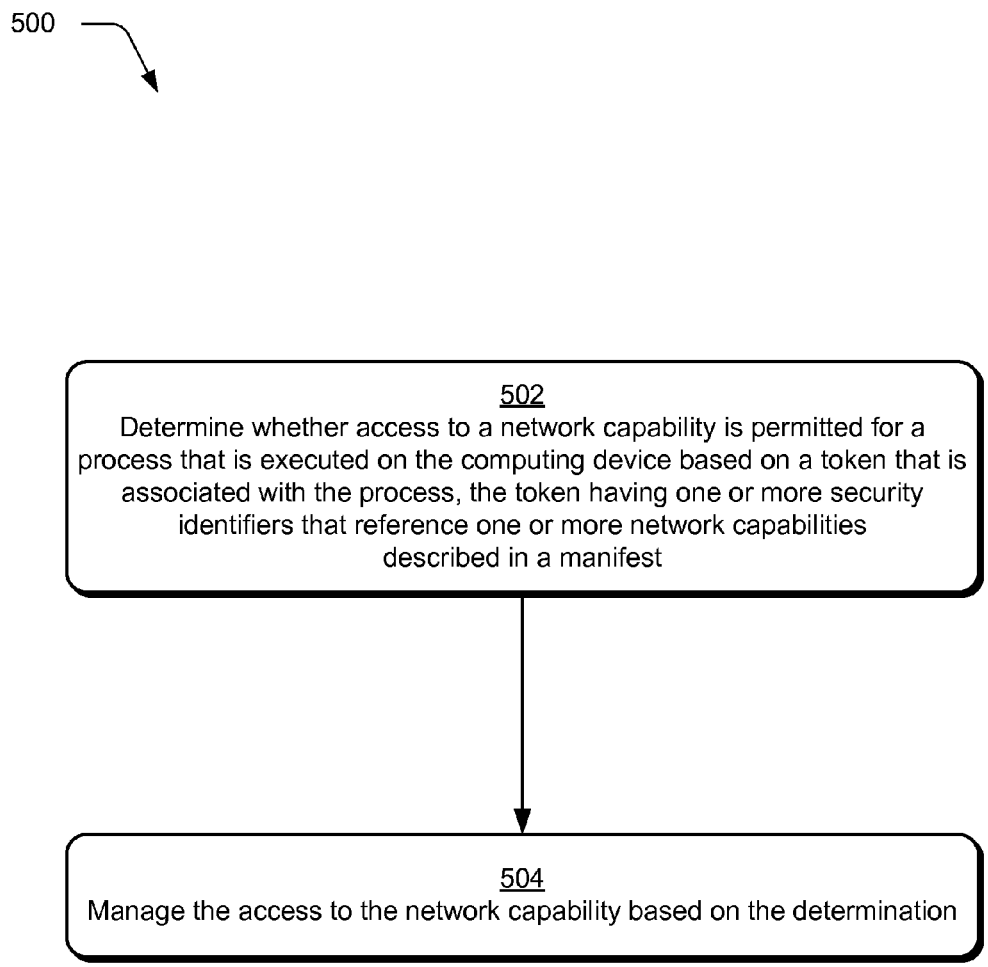
FIG. 5 is a flow diagram depicting a procedure in an example implementation in which access to capabilities is managed by a computing device using the token formed in FIG. 4.

FIG. 5 depicts a procedure 500 in an example implementation in which access to network capabilities is managed by a computing device using the token formed in FIG. 4. A determination is made as to whether access to a network capability is permitted for a process that is executed on the computing device based on a token that is associated with the process, the token having one or more security identifiers that reference one or more network capabilities described in a manifest (502). For example, a request may be received by the process manager module 114 from a process. The process 210 may be implemented through execution of the executable code 118 by the computing device 102 as previously described.

A token 212 may then be located by the process manager module 114, e.g., using a package 116 identifier, "strong types," and so on as previously described. The token 212 may be formed to describe access that is permitted (e.g., reference the capabilities that are permitted) and/or describe access that is not permitted, e.g., reference capabilities that are not permitted to be access by a corresponding process 210.

Access to the network capability is managed based on the determination (block 504). The process manager module 114, for instance, may receive a request from the process 210 to access a network capability, such as to use an outgoing network connection. The process manager module 114 may then examine the token 212 to determine whether this network access is permitted, such as to locate a security identifier that references the outgoing network communication. Thus, the process manager module 114 may readily determine what access is permitted and reach accordingly. As previously described, a variety of other examples are also contemplated, such as to determine which access is not permitted based on enumeration by the token 212.

Figure 6:
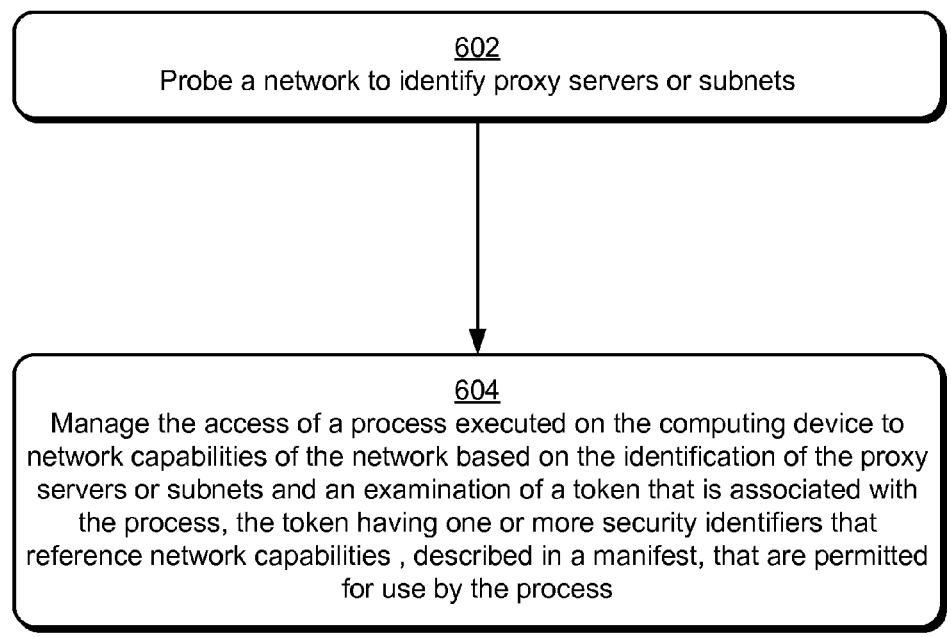
FIG. 6 is a flow diagram depicting a procedure in an example implementation in which probing is used along with a token to manage per process access to network capabilities.

FIG. 6 depicts a procedure 600 in an example implementation in which a network is probed to identify proxy servers or subnets, which is used to aid management of network capability access given to a process. A network is probed to identify proxy servers or subnets (block 602). This may be performed by forming one or more communications to be sent to the servers, detect of network settings, and so on.

Access of a process executed on the computing device to network capabilities of the network is managed based on the identification of the proxy servers or subnets and an examination of a token that is associated with the process, the token having one or more security identifiers that reference network capabilities, described in a manifest, that are permitted for use by the process (block 604). As before, the access may be managed by the process manager module 114 through use of the token that "says" what capabilities are permitted to be access by a process associated with the token. Further, the probing may be used to ensure that access to a network is consistent with this enumeration, e.g., that access accurately reflects whether a device is accessible via a subnet or the Internet, and so on. A variety of other examples are also contemplated.

Example System and Device

Figure 7:
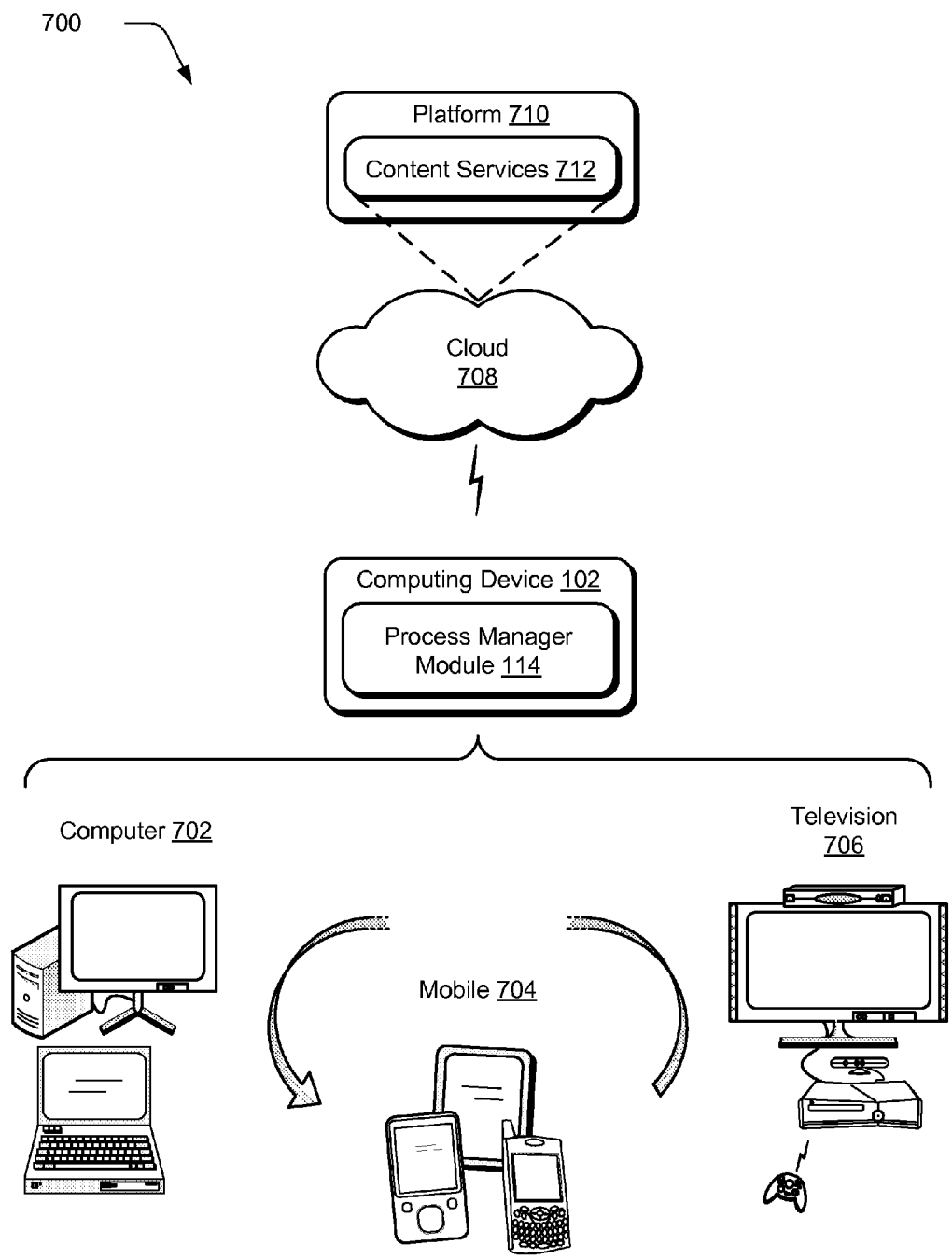
FIG. 7 illustrates an example system that includes the computing device as described with reference to FIG. 1.

FIG. 7 illustrates an example system 700 that includes the computing device 102 as described with reference to FIG. 1. The example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 702, mobile 704, and television 706 uses. Each of these configurations includes devices that may have generally different constructs and capabilities, and thus the computing device 102 may be configured according to one or more of the different device classes. For instance, the computing device 102 may be implemented as the computer 702 class of a device that includes a personal computer, desktop computer, a multi-screen computer, laptop computer, netbook, and so on.

The computing device 102 may also be implemented as the mobile 704 class of device that includes mobile devices, such as a mobile phone, portable music player, portable gaming device, a tablet computer, a multi-screen computer, and so on. The computing device 102 may also be implemented as the television 706 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 708 includes and/or is representative of a platform 710 for content services 712. The platform 710 abstracts underlying functionality of hardware (e.g., servers) and software resources of the cloud 708. The content services 712 may include applications and/or data that can be utilized while computer processing is executed on servers that are remote from the computing device 102. Content services 712 can be provided as a service over the Internet and/or through a subscriber network, such as a cellular or Wi-Fi network.

The platform 710 may abstract resources and functions to connect the computing device 102 with other computing devices. The platform 710 may also serve to abstract scaling of resources to provide a corresponding level of scale to encountered demand for the content services 712 that are implemented via the platform 710. Accordingly, in an interconnected device embodiment, implementation of functionality of the functionality described herein may be distributed throughout the system 700. For example, the functionality may be implemented in part on the computing device 102 as well as via the platform 710 that abstracts the functionality of the cloud 708.

Figure 8:
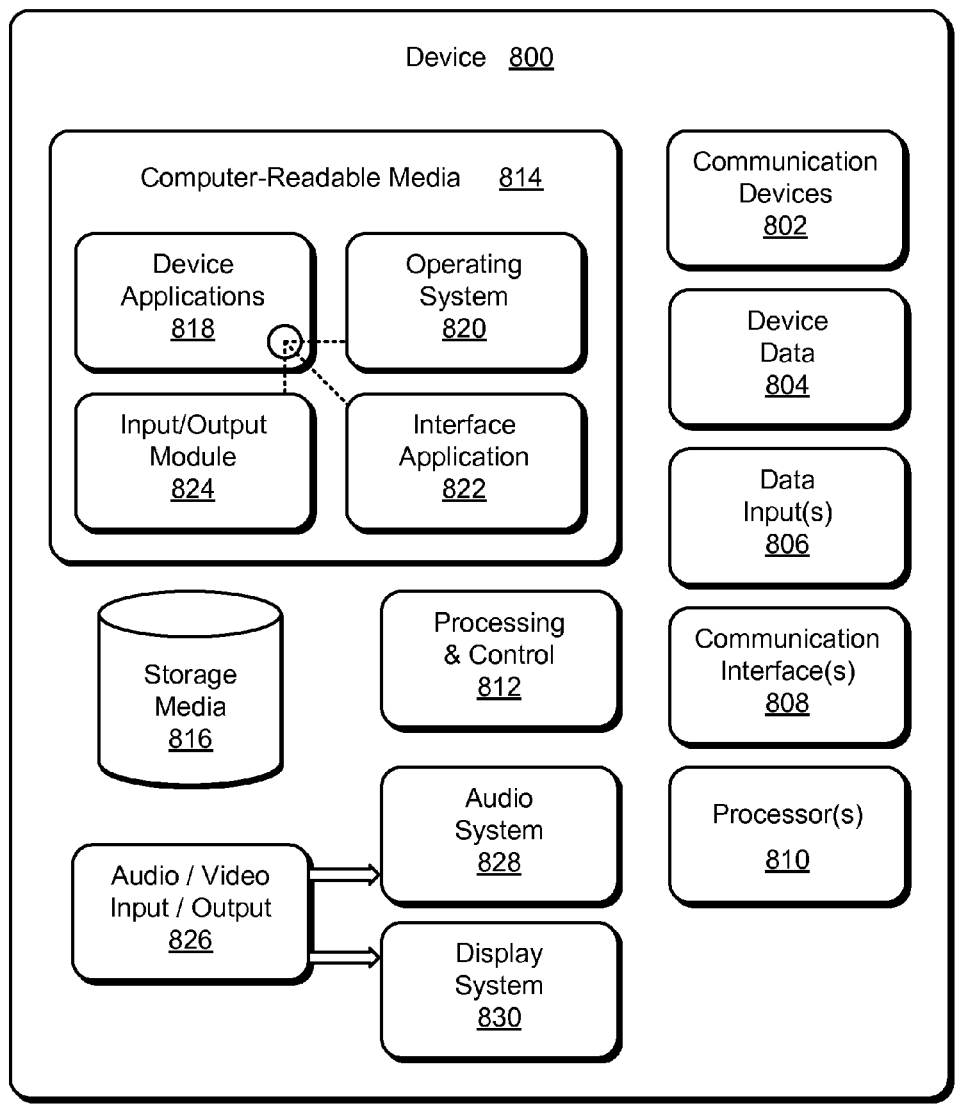
FIG. 8 illustrates various components of an example device that can be implemented as any type of computing device as described with reference to FIGS. 1-3 and 7 to implement embodiments of the techniques described herein.

FIG. 8 illustrates various components of an example device 800 that can be implemented as any type of computing device as described with reference to FIGS. 1, 2, and 7 to implement embodiments of the techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of the techniques described herein. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include any system components or modules to implement embodiments of the techniques described herein. In this example, the device applications 818 include an interface application 822 and an input/output module 824 that are shown as software modules and/or computer applications. The input/output module 824 is representative of software that is used to provide an interface with a device configured to capture inputs, such as a touchscreen, track pad, camera, microphone, and so on. Alternatively or in addition, the interface application 822 and the input/output module 824 can be implemented as hardware, software, firmware, or any combination thereof. Additionally, the input/output module 824 may be configured to support multiple input devices, such as separate devices to capture visual and audio inputs, respectively.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   requesting, by a process executed locally on the computing device, access to a firewall-type network capability of the computing device comprising an incoming or outgoing connection from or to a remote computing device, respectively;
   creating, by the computing device, a token associated with the process responsive to execution of the process, the token comprising one or more security identifiers, the security identifiers corresponding to one or more network capabilities defined in a manifest stored locally as part of installation of executable code that, when executed, implements the process;
   determining, by the computing device and without input from a remote resource, whether the access is permitted for the process by comparing the access requested by the process to the token created in response to the execution of the process; and
   managing the access, by the computing device, to the network capability based on the determination.

2. The method as described in claim 1, wherein the manifest is generated by a developer of the executable code to describe which network capabilities the executable code is permitted to access.

3. The method as described in claim 2, wherein the manifest is stored in a tamper-resistant location as part of installation of the executable code on the computing device.

4. The method as described in claim 1, wherein the token is formed by accessing a description of the capabilities stored in a tamper-resistant location of the computing device that is not accessible to the process.

5. The method as described in claim 1, wherein at least one said network capability described in the manifest indicates whether loopback by the process is permitted.

6. The method as described in claim 1, wherein at least one said network capability described in the manifest indicates whether an outgoing connection over a network is permitted for use by the process.

7. The method as described in claim 1, wherein at least one said network capability described in the manifest indicates whether incoming and outgoing connections over a network is permitted for use by the process.

8. The method as described in claim 7, wherein the incoming connection permits the process to accept an unsolicited connection.

9. The method as described in claim 1, wherein at least one said network capability described in the manifest indicates whether private network access is permitted for use by the process.

10. The method as described in claim 1, wherein:
    one said capability involves access to specific network traffic described by ports and IP addresses; or
    another said capabilities involves access to a remote network when traffic is guaranteed to arrive at such remote network securely.

11. The method as described in claim 1, wherein at least one said capability is configured to enforce changing network traffic over different periods of time dynamically.

12. A method implemented by a computing device, the method comprising:
    probing a network, by the computing device, to identify proxy servers or subnets by forming one or more communications to be sent to one or more servers and detecting one or more network settings of identified proxy servers or subnets;

examining a token, by the computing device, that is associated with a process running locally on the computing device and created locally subsequent to executing the process, the token having one or more security identifiers that reference firewall-type network capabilities of the computing device comprising proxy server or subnet settings that are registered with a tamper resistant capabilities store during installation, described in a manifest, that are permitted for use by the process;

determining, by the computing device and without further input by a network, based on the probing of the network, that access to network capabilities of the network by the process is consistent with enumeration of the token and the proxy or subnet capabilities referenced therein; and managing access of the process executed locally on the computing device to the network capabilities of the network, by the computing device, by comparing the identification of the proxy servers or subnets with the examination of the token that is associated with the process.

13. The method as described in claim 12, wherein the token is formed by accessing a description of the network capabilities stored on the computing device during installation of executable code that, responsive to execution, implements the process.

14. The method as described in claim 12, wherein the probing and the managing are performed as part of execution of an operating system by the computing device to define, consume, and store boundaries that are to be enforced.

15. The method as described in claim 12, wherein the probing includes proving of local subnets, active directories, http proxies, or administrative settings to pre-specify entities.

16. A computing device comprising:
a processing system; and
one or more computer-readable storage devices comprising instructions stored thereon that, responsive to execution on a computing device, causes the computing device to execute an operating system to perform operations comprising:
forming a token responsive to execution of a process by the processing system, the process comprising a request for an inbound or an outbound network connection to a remote computing device, the token having one or more security identifiers that reference firewall-type network capabilities of the computing device described in a local manifest that corresponds to the process formed through execution of executable code by the computing device, the firewall-type network capabilities defined by a developer of the executable code and registered with a tamper resistant capabilities stored during installation on the computing device, the executable code and the local manifest installed on the computing device from a package; and
managing access of the process to the requested inbound or outbound network connection using the token by comparing the requested inbound or outbound connection to the firewall-type network capabilities of the computing device described in the local manifest.

17. The computing device as described in claim 16, wherein at least one said network capability described in the local manifest indicates whether an outgoing connection over a network is permitted for use by the process.

18. The computing device as described in claim 16, wherein at least one said network capability described in the local manifest indicates whether incoming and outgoing connections over a network is permitted for use by the process, the incoming connection permits the process to accept an unsolicited connection.

19. The computing device as described in claim 16, wherein the requesting access to the firewall-type network capability of the computing device comprises requesting communication through a proxy server or subnet and the one or more network capabilities defined in the manifest comprise allowable proxy servers or subnets.

20. The computing device as described in claim 16, wherein the request for an inbound or an outbound network connection to a remote computing device comprises requesting communication through a proxy server or subnet and the firewall-type network capabilities of the computing device described in a local manifest comprise allowable proxy servers or subnets.

21. A system comprising:
a processing system; and
memory configured to maintain instructions that are executable by the processing system to perform operations comprising:
requesting, by a process executed locally on the computing device, access to a firewall-type network capability of the computing device comprising an incoming or outgoing connection from or to a remote computing device, respectively;
creating, by the computing device, a token associated with the process responsive to execution of the process, the token comprising one or more security identifiers, the security identifiers corresponding to one or more network capabilities defined in a manifest stored locally as part of installation of executable code that, when executed, implements the process;
determining, by the computing device and without input from a remote resource, whether the access is permitted for the process by comparing the access requested by the process to the token created in response to the execution of the process; and
managing the access, by the computing device, to the network capability based on the determination.

22. The system as described in claim 21, wherein at least one said network capability described in the manifest indicates whether an outgoing connection over a network is permitted for use by the process.

23. The system as described in claim 21, wherein at least one said network capability described in the manifest indicates whether incoming and outgoing connections over a network is permitted for use by the process, the incoming connection permits the process to accept an unsolicited connection.

24. The system as described in claim 21, wherein the request for an inbound or an outbound network connection to a remote computing device comprises requesting communication through a proxy server or subnet and the firewall-type network capabilities of the computing device described in the manifest comprise allowable proxy servers or subnets.

* * * * *